Sept. 14, 1965 W. J. WHITE 3,205,714
VERTICAL DYNAMIC BALANCING APPARATUS
Filed Feb. 25, 1963 3 Sheets-Sheet 1
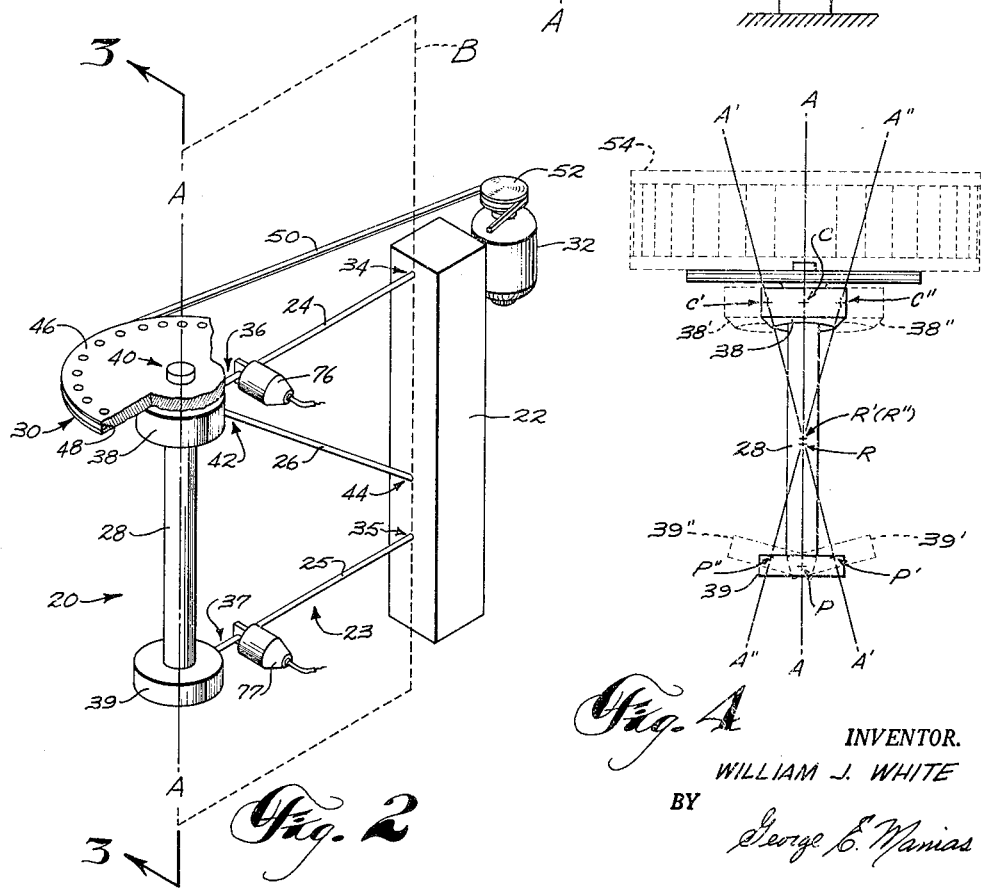
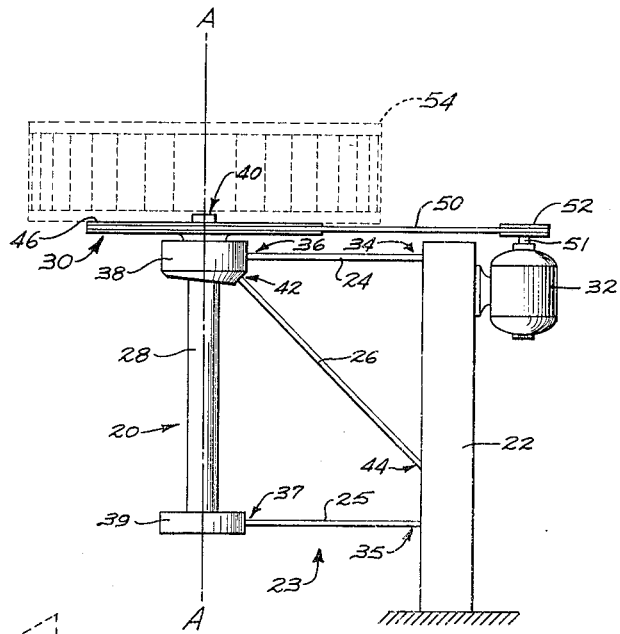
INVENTOR.
WILLIAM J. WHITE
BY
George E. Manias
AGENT

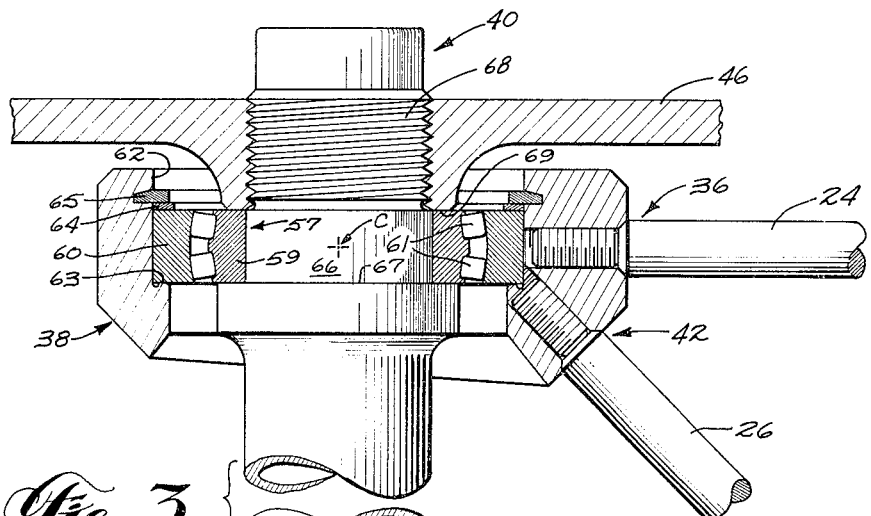
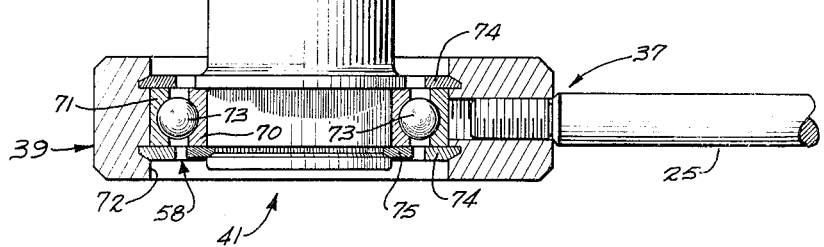
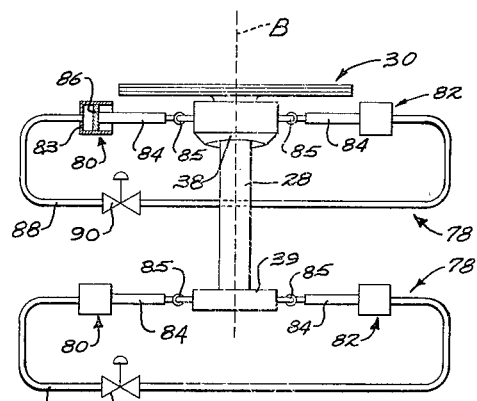
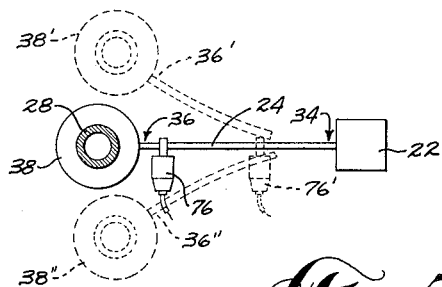
INVENTOR.
WILLIAM J. WHITE
BY George E. Manias
AGENT Sept. 14, 1965　　　　W. J. WHITE　　　　3,205,714
VERTICAL DYNAMIC BALANCING APPARATUS
Filed Feb. 25, 1963　　　　　　　　　　3 Sheets-Sheet 3
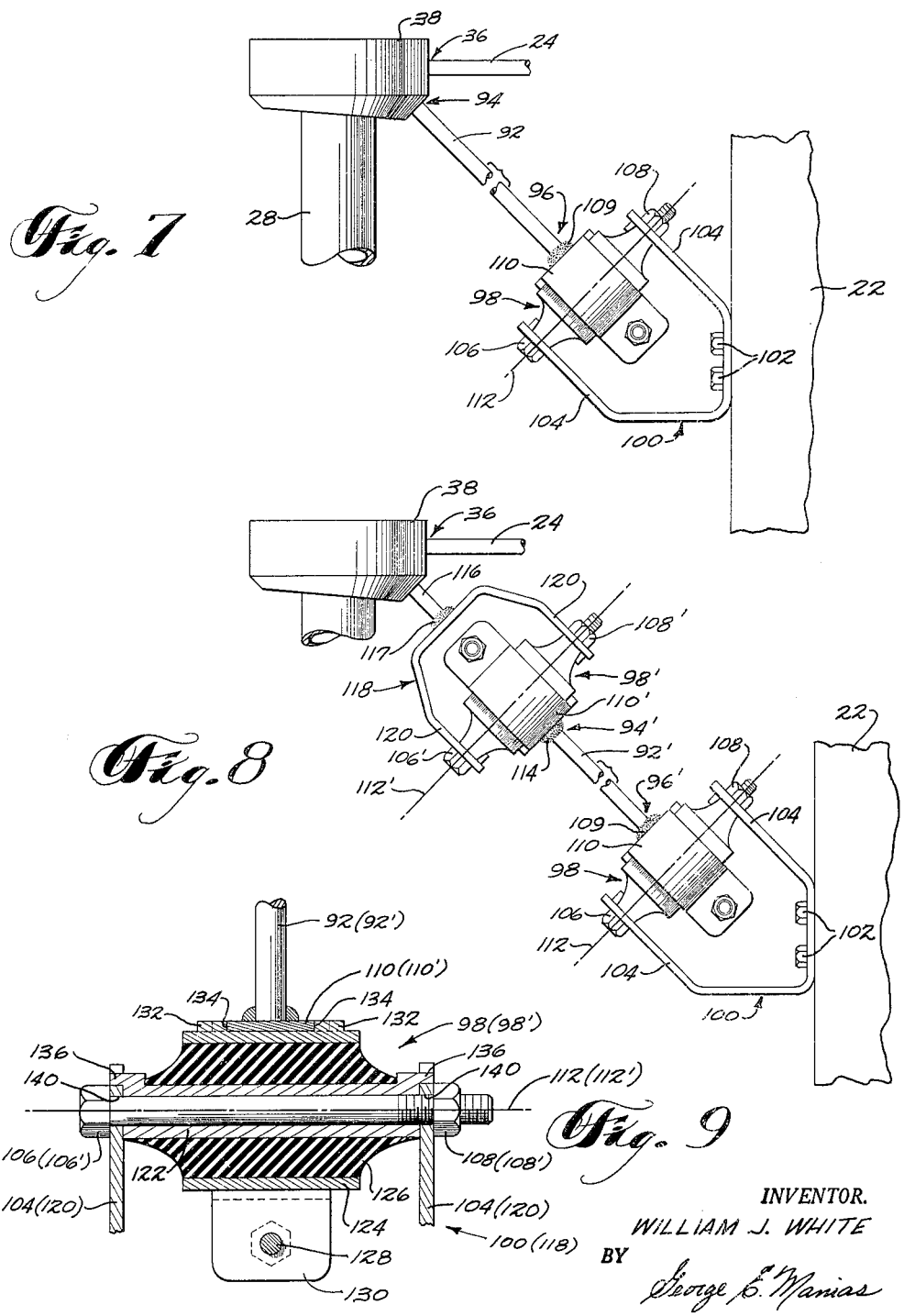
INVENTOR.
WILLIAM J. WHITE
BY
George C. Manias
AGENT

3,205,714
VERTICAL DYNAMIC BALANCING APPARATUS
William J. White, Columbus, Ohio, assignor to International Research and Development Corporation, Worthington, Ohio, a corporation of Ohio
Filed Feb. 25, 1963, Ser. No. 260,504
15 Claims. (Cl. 73—471)

The present invention relates to balancing apparatus and more particularly to a dynamic balancing stand for determining the imbalance of a rotor about a vertical axis.

According to the present invention, a vertical dynamic balancing stand is provided which includes a fixed vertical standard. A pair of spaced, generally horizontal, vibratory members are cantilevered from the fixed vertical standard. Preferably, each of the horizontal vibratory members comprises at least one flexible reed having a fixed end rigidly secured to the fixed vertical standard and a free end. A normally vertical drive shaft is rotatably secured to the free ends of the horizontal vibratory members and includes a mounting means secured to one of its ends. The mounting means is adapted to support a rotor with its rotational axis and the rotational axis of the drive shaft substantially aligned along a common vertical axis.

The present dynamic balancing stand also includes a brace member which extends from the free end of one of the horizontal vibratory members to the fixed vertical standard. The brace member is a load supporting member and maintains the horizontal vibratory members in their generally horizontal position. As will be described in detail later in the specification, the brace member may function as a vibratory member in a manner similar to the horizontal vibratory members. Alternatively the brace member may function as an inert member which does not undergo bending.

The pair of horizontal vibratory members, the brace member and the common vertical axis are so disposed whereby they normally lie in a common vertical plane.

A drive means is provided for rotating the drive shaft and a rotor which is secured to the mounting means. When the rotor is rotated, its imbalance will cause each horizontal vibratory member to bend about its fixed end whereby its free end will oscillate in a substantially horizontal plane. Simultaneously, the drive shaft is caused to oscillate about a rocking point which is disposed on the common vertical axis.

The present balancing stand is a dynamic balancing stand wherein the imbalance of a rotor may be determined in two planes of the rotor. These planes are known as correction planes. To determine the amount and location of the imbalances in the correction planes, the free end of each of the horizontal vibratory members is provided with a vibration transducer which serves to convert the mechanical vibrations of each free end into electrical signals. It should be noted that the mechanical vibrations of each free end may be related to one of the correction planes of the rotor. Hence "two plane" or dynamic balancing can be achieved with the present balancing stand.

The free end of each horizontal vibratory member is also provided with a unitary locking and damping means. Thus when it is desired to provide a fixed rocking point about which the drive shaft and the rotor can oscillate, one of the free ends may be locked in a fixed position. Also when it is necessary to place or remove a rotor from the mounting means, both of the free ends may be locked in a fixed position. Further, each free end also may be individually dampened so as to bring the amplitude of large vibrations associated therewith to a value which is within the sensitivity range of the electronic measuring equipment.

Rotor types which may be conveniently balanced on the present balancing stand include pump impellers and centrifugal blower fans. It should be evident that large diameter rotors are more conveniently supported and balanced on a low vertical balancing stand than on horizontal balancing stands wherein the diameter of the rotor may exceed the height adjustment of the support stands.

The principal objects of the present invention include:

To provide a balancing stand for supporting a rotor for rotation about a vertical axis;

To provide a balancing stand for dynamically balancing a rotor supported for rotation about a vertical axis;

To provide a dynamic balancing stand having dampening means for reducing the amplitude of the mechanical vibrations to within the measuring range of electronic vibration measuring equipment; and To provide a dynamic balancing stand having means for reducing the distance traveled by a vibration transducer whereupon the amplitude of the mechanical vibrations is reduced to within the sensitivity range of electronic vibrations measuring equipment.

These and other objects and advantages of the present invention will become apparent from the following detailed description by reference to the accompanying drawings in which:

FIGURE 1 is a side elevation view of the present vertical dynamic balancing stand illustrating a novel suspension means for supporting a vertical drive shaft;

FIGURE 2 is a perspective view, partly in cross-section, further illustrating the present vertical dynamic balancing stand;

FIGURE 3 is a fragmentary cross-sectional view taken along the line 3—3 of FIGURE 2 and illustrating a drive shaft and bearing blocks of the present invention;

FIGURE 4 is a front elevation view of the present vertical dynamic balancing stand illustrating a rocking point about which a vertical drive shaft oscillates;

FIGURE 5 is a plan view of an upper horizontal vibratory member of the present invention illustrating a positionable vibration transducer secured thereon;

FIGURE 6 is a front elevation view of the present vertical dynamic balancing stand schematically illustrating a unitary locking and damping means;

FIGURE 7 is a fragmentary side elevation view illustrating an alternative embodiment of a brace member of the present invention;

FIGURE 8 is a fragmentary side elevation view illustrating a further alternative embodiment of a brace member of the present invention; and FIGURE 9 is a cross-sectional view of an elastomeric member employed in the embodiments of FIGURES 6 and 7.

PREFERRED EMBODIMENT

Balancing stand

Reference is now directed to FIGURES 1 and 2 wherein the preferred embodiment of the present invention is illustrated.

A vertical dynamic balancing stand, indicated by the numeral 20, generally includes a fixed vertical standard 22; a novel suspension means 23 comprising a pair of spaced, generally horizontal vibratory members 24, 25 and a brace member 26; a normally vertical drive shaft 28; and a mounting means 30 and a drive means 32.

The fixed vertical standard 22 may comprise any suitable support member, as for example, a steel column or I-beam. The fixed vertical standard 22 serves as the stationary support of the present vertical dynamic balancing stand 20.

The upper and lower horizontal vibratory members 24, 25 respectively, each preferably comprise at least one flexible reed which is cantilevered from the fixed vertical standard 22. The horizontal vibratory members 24, 25 have fixed ends 34, 35 and free ends 36, 37 respectively. The fixed ends 34, 35 each are rigidly secured to the fixed vertical standard 22. Since each of the horizontal vibratory members 24, 25 preferably comprise a flexible reed, the free end thereof may be caused to oscillate by bending the flexible reed about its fixed end. Hence the free end 36 may be oscillated by bending the upper horizontal vibratory member 24 about its fixed end 34. Similarly, the free end 37 may be oscillated by bending the lower horizontal vibratory member 25 about its fixed end 35. Secured to the free ends 36, 37 are bearing blocks 38, 39 respectively each of which retain a suitable bearing element. The bearing elements will be described later in the specification with reference to FIGURE 3.

The normally vertical drive shaft 28 is rotatably secured to the free ends 36, 37 by extending through and being supported by the bearing blocks 38, 39. The normally vertical drive shaft 28 preferably is a substantially rigid member comprising, as for example, a tubular member such as seamless steel tubing. The normally vertical drive shaft 28 has a first shaft end 40 and a second shaft end 41. The first shaft end 40 extends above the upper horizontal vibratory member 24 and the fixed vertical standard 22.

In order to prevent undue downward bending of the horizontal vibratory members 24, 25, the present balancing stand 20 is provided with the brace member 26 which extends between the free end 25 and the fixed vertical standard 22. In this embodiment the brace member 26 functions as a vibratory member, i.e., the brace member undergoes bending. The brace member 26 preferably comprises at least one flexible reed having a free end 42 rigidly secured to the bearing block 38 adjacent to the free end 36 and a fixed end 44 rigidly secured to the fixed vertical standard 22 at a point between the fixed ends 34, 35. As in the case of the horizontal vibratory members 24, 25, the free end 42 of the brace member 26 can be oscillated by bending the brace member 26 about its second end 44. Notice that the first end 42 will oscillate with the free end 36. Hence the first end 42 of the brace member 26 is in reality a free end which functions in the same manner as the free ends 36, 37 of the upper and lower horizontal vibratory members 24, 25. Similarly, the second end 44 of the brace member 26, is in reality a fixed end which functions in the same manner as the fixed ends 34, 35 of the upper and lower horizontal vibratory members 24, 25.

In this embodiment, the horizontal vibratory members 24, 25 and the brace member 26 all undergo bending about their respective fixed ends 34, 35 and 44. All of these elements serve as vibratory members. The horizontal vibratory members 24, 25 and the brace member 26 each preferably comprise at least one flexible reed. Preferably, each reed has a substantially uniform spring constant in all directions of bending. Further, in the case of the brace member 26, the reed should have sufficient column strength in order to support the axial thrust applied thereon by the weight of the rotor. Steel rods which have a circular cross-section possess these characteristics. Thus each flexible reed preferably comprises a steel rod having a circular cross-section, as for example, drill rod.

The mounting means 30 preferably comprises a mounting plate 46 which is non-rotatably secured to the shaft end 40 and which has a peripheral groove 48 formed therein which is adapted to receive a drive belt 50.

The drive means 32 preferably comprises a variable speed motor secured to the upper end of the fixed vertical standard 22 and includes a motor shaft 51 having a drive pulley 52 secured thereto. The drive pulley 52 is adapted to receive the drive belt 50 for rotating the mounting means 30 and hence the drive shaft 28. It should be noted that the upper surfaces of the mounting means 30 and the drive pulley 52 are substantially in the same horizontal plane. Hence there are no projections above the mounting means 30 which would limit the size, that is the diameter, of a rotor which can be supported by the present balancing stand 20.

Illustrated in phantom outline in FIGURE 1, is a rotor 54 which is secured to the mounting means 30 for rotation about a vertical axis. The mounting means 30 serves to support a rotor with its rotational axis and the rotational axis of the drive shaft 28 substantially aligned along a common vertical axis indicated by the dash-dot line labeled A—A.

In FIGURE 2, a common vertical plane is indicated by the dotted outline labeled B. The present balancing stand 20 is constructed so that the upper and lower horizontal vibratory members 24, 25, the brace member 26 and the common vertical axis A—A normally lie in the common vertical plane B.

Reference is now directed to FIGURE 3 wherein there is illustrated the bearing elements retained within the bearing blocks 38, 39. FIGURE 3 is a cross-sectional view taken through the vertical plane B illustrated in FIGURE 2.

The first shaft end 40 of the drive shaft 28 is connected to the bearing block preferably by means of a pivotal journal means such as the spherical bearing 57 illustrated. The second shaft end 41 is connected to the bearing block 39 by means of a non-pivotal journal means such as the ball bearing 58 illustrated.

The spherical bearing 57 includes an inner race 59, an outer race 60 and bearings 61. As can be seen, the outer race 60 is engaged in a bore 62 and abuts a shoulder 63 of the bearing block 38. A spacer shim 64 and snap ring 65 retain the outer race 60 in the position shown. Hence the outer race 60 and the bearing block 38 are pivotal as a unit about a point on the drive shaft 28 which is indicated at C. The drive shaft 28 has a cut down portion 66 and a shoulder 67. The inner race 59 is engaged over the cut down portion 66 and abuts the shoulder 67 of the drive shaft 28. The mounting plate 46 is threaded on a threaded portion 68 of the first shaft end 40 and includes a shoulder 69 which abuts the inner race 59. The mounting plate 46 retains the inner race 59 in the position illustrated.

The ball bearing 58 which is retained within the bearing block 39, comprises an inner race 70 engaged with the second shaft end 41, an outer race 71 engaged in a bore 72 of the bearing block 39 and bearings 73. Snap rings 74 and 75 retain the ball bearing 58 in the position illustrated, viz., between the second shaft end 41 and the bearing block 39.

It should be noted that since the bearing block 39 is non-pivotally connected to the drive shaft 28, the lower horizontal vibratory member 25 will be subjected to transverse bending and torsional twisting when the second shaft end 41 oscillates.

It should also be noted that since the bearing block 38 is pivotally connected to the drive shaft 28, the upper horizontal vibratory member 24 and the brace member 26 will be subjected substantially entirely to transverse bending. That is to say, when the drive shaft 28 oscillates under the impetus of the rotor's unbalance, the bearing block 38 will remain in a substantially horizontal position by virtue of its pivotal connection to the drive shaft 28. Hence the upper horizontal vibratory member 24 and the brace member 26 will be subjected substantially entirely to transverse bending and will undergo little, if any, torsional twisting.

Reference is now directed to FIGURES 1 and 4. FIGURE 4 is a schematic front view of the present balancing stand which illustrates an exaggerated range of oscillations through which the common vertical axis A—A and the drive shaft 28 may extend.

In the present balancing stand, the drive shaft 28 will oscillate about a rocking point disposed on the common vertical axis A—A and normally above the lower horizontal vibratory member 25. In FIGURE 4, dash-dot lines A'—A' and A"—A" are shown to illustrate the limits of the above mentioned exaggerated range of oscillations. A cross identified by the letter R indicates the position of the rocking point when the common vertical axis A—A is in a vertical position. A cross, identified by the letter R' (R"), indicates the raised position of the rocking point when the common vertical axis is displaced into the positions indicated by the dash-dot lines A'—A' and A"—A".

The pivotal point C (see FIGURE 3) of the spherical bearing 57 (not shown in FIGURE 4) is illustrated by the cross on the bearing block 38. The bearing block 38 also has been illustrated in phantom outline in its displaced positions which are numbered 38', 38".

The bearing block 39 also has been illustrated in phantom outline in its displaced positions which are numbered 39', 39". A reference mark or cross is shown on the bearing block 39, 39' and 39" and indicated at P, P' and P" respectively.

When the rotor 54 is rotated, its imbalance will cause the drive shaft 28 to oscillate about the rocking point R. However since the bearing block 38 is pivotally connected to the drive shaft 28 and because of the novel support provided by the upper horizontal vibratory member 24 and the brace member 26, the bearing block 38 while laterally displaced will still remain in a substantially horizontal position as indicated in FIGURE 4 at 38' and 38". Because of this substantially horizontal motion, the rocking point R will experience displacement axially along the common vertical axis. The extreme positions of the rocking point are indicated at R and R' (R"). Simultaneously and for the same reasons, the bearing block 39 and its reference mark P will (1) experience vertical displacement axially along the common vertical axis; and (2) experience a lateral displacement. The extreme positions of the bearing block and the reference mark are indicated at 38', 38" and P', P" respectively.

The present suspension means 23 thus provides a unique means by which the present balancing stand 20 can support a rotor for rotation about a vertical axis and permit the rotor to be dynamically balanced.

It should be noted at this point, that in this specification, a free end is defined as that end of a horizontal vibratory member or of a brace member which will undergo lateral oscillatory motion out of the common vertical plane B when acted upon by the force corresponding to the imbalance of a rotor. Further, in this specification, a fixed end is defined as that end of a horizontal vibratory member or of a brace member about which the horizontal vibratory member or the brace member will bend or pivot.

*Vibration transducers*

Referring to FIGURES 2 and 5, the present balancing stand 20 is provided with vibration transducers 76, 77, one each releasably secured to each of the horizontal vibratory members 24, 25 respectively and positioned normal to the common vertical plane B (see FIGURE 2). The vibration transducers 76, 77 preferably are secured adjacent to the free ends 36, 37 and serve to convert the mechanical vibrations of the free ends 36, 37 into electrical signals. Any suitable vibration transducer may be used. For example, the transducer disclosed in U.S. Patent 2,754,435, by T. Ongaro, assigned to the assignee of the present invention.

Illustrated in solid lines in FIGURE 5, is the upper horizontal vibratory member 24, the bearing block 38, the fixed vertical standard 22 and the vibration transducer 76. Illustrated in phantom outline is the exaggerated lateral displacement of the free end 36 and the bearing block 38. In their displaced positions, the free end and the bearing block are identified by the numerals 36', 36" and 38', 38" respectively.

As hereinbefore stated, the vibration transducers are releasably secured to the horizontal vibratory members. Hence the vibration transducer 76 may be positioned along the upper horizontal vibratory member 24—a second position being illustrated by a vibration transducer 76' shown in phantom outline.

Inspection of FIGURE 5 will reveal that the lateral displacement of the transducer 76 is greater than the lateral displacement of the transducer 76'. Should the mechanical vibrations of the rotor be large, the vibration transducer, if desired, may be moved inwardly along the horizontal vibratory member toward the fixed vertical standard 22 to a position where the lateral displacements are small. Hence, the positionability of the vibration transducers 76, 77 is one means by which the large mechanical vibrations of a rotor may be brought within the sensitivity range of the electronic vibration measuring equipment.

*Unitary locking and damping means*

Reference is now directed to FIGURE 6 wherein there is schematically illustrated a unitary locking and damping means 78, for each of the bearing blocks 38, 39. Both unitary locking and damping means 78 are identical and corresponding numerals will be employed to identify corresponding parts described.

The present unitary locking and damping means 78 is provided on each of the bearing blocks 38, 39 and serves to lock the bearing blocks 38, 39 in a fixed position when desired and, when desired to limit the lateral displacements of the bearing blocks 38, 39 caused by the imbalance of a rotating rotor secured to the mounting means 30. Each of the bearing blocks 38, 39 may be individually locked or damped which ever is desired.

The unitary locking and damping means 78 comprise first and second dashpots 80, 82 maintained in opposed axially aligned relation on opposite sides of the bearing blocks 38, 39 and positioned normal to the common vertical plane B (dotted line). The dashpots 80, 82, each include a cylindrical body 83 and a piston shaft 84 secured at one end to the bearing blocks 38, 39 preferably by means of a universal joint 85. The other end of the piston shaft 84 is secured to a piston 86 which is engaged with the inner surface of the cylindrical body 83. Conduit means 88, connected at each end with one of the dashpots 80, 82, provides communication between the dashpots 80, 82 for a working fluid. A valve means 90 is positioned in the conduit means 88 and serves to restrict the flow of working fluid through the conduit means 88.

It should be evident that the valve means 90 may be closed completely thereby causing the bearing blocks 38, 39 and the drive shaft 28 to be locked in a fixed position so that, for example, a rotor may be secured to or removed from the mounting means 30.

In the absence of the damping means 78, the range of oscillations of the bearing blocks 38, 39 (hence the free ends 36, 37) would be directly proportional to the forces produced by the imbalance of a rotating rotor. However, the presence of the damping means 78 provides an adjustable resisting force which limits the lateral displacements or range of oscillations of the bearing blocks 38, 39. The valve means 90 provides the resisting force by restricting the flow of working fluid through the conduit means 88.

ALTERNATIVE EMBODIMENTS

*Inert brace member*

In FIGURES 7 and 8, there are illustrated two alternative embodiments of the brace member of the present balancing stand 20. Corresponding numerals will be employed to identify corresponding parts already described.

As hereinbefore stated, the brace member may function as a vibratory member, as in the preferred embodiment, or as an inert brace member. In these embodiments, the brace member functions as an inert brace member, i.e., it does not undergo bending as in the case of the brace member 26 of the preferred embodiment.

One pivotal end

Referring to FIGURE 7, an inert brace member 92 has a free end 94 and a fixed end 96. The free end 94 is rigidly secured to the bearing block 38 as in the preferred embodiment. The fixed end 96 is resiliently and pivotally connected to the fixed vertical standard 22 preferably by means of an elastomeric member generally indicated by the numeral 98. The elastomeric member 98 will be described in detail by reference to FIGURE 9, later in the specification.

A generally U-shaped bracket 100 is secured to the fixed vertical standard 22 by any suitable means, such as fasteners 102. The U-shaped bracket 100 includes arms 104 which are engaged with and non-rotatably secured to the ends of the elastomeric member 98 by means of a fastener such as bolt 106 and nut 108.

Secured to the fixed end 96 of the inert brace member 92, as for example by means of a weld 109, is a clamp member 110 which surrounds and is non-rotatably secured to the elastomeric member 98. The elastomeric member 98 has a longitudinal axis, indicated by the dash-dot line 112, about which the inert brace member 92 is pivotal. The elastomeric member 98 preferably is oriented so that its longitudinal axis 112 lies in the common vertical plane B (see FIGURE 2). Hence the free end 94 of the inert brace member 92 can oscillate with the free end 36 of the upper horizontal vibratory member 24 when the inert brace member 92 pivots about the longitudinal axis 112 of the elastomeric member 98.

Two pivotal ends

A further alternative embodiment of the present inert brace member is illustrated in FIGURE 8. In this embodiment both ends of the inert brace member are pivotal.

Referring to FIGURE 8, an inert brace member 92' has a free end 94' and a fixed end 96'. The free end 94' is resiliently and pivotally connected to the bearing block 38 by means of a second elastomeric member 98' which is identical with the elastomeric member 98. The fixed end 96' is resiliently and pivotally connected to the fixed vertical standard 22 by means of the elastomeric member 98—this connection being identical with that shown in FIGURE 7 which has already been described.

The elastomeric members 98, 98' are identical and will be described in detail by reference to FIGURE 9, later in the specification.

Secured to the free end 94' as for example by means of a weld 114, is a second clamp member 110' which is identical with the clamp member 110. The clamp member 110' surrounds and is non-rotatably secured to the elastomeric member 98'. The elastomeric member 98' has a longitudinal axis, indicated by the dash-dot line 112', about which the inert member 92' is pivotal. The elastomeric member 98' preferably is oriented so that its longitudinal axis 112' lies in the common vertical plane B (see FIGURE 2).

Extending from the bearing block 38 is a stub member 116. Secured to the end of the stub member 116, as for example by means of a weld 117, is a generally U-shaped bracket 118. The U-shaped bracket 118 includes arms 120 which are engaged with and are non-rotatably secured to the ends of the elastomeric member 98' by means of a fastener such as bolt 106' and nut 108'.

Hence in this embodiment, the inert brace member 92' is pivotal about both longitudinal axes 112, 112' of the elastomeric members 98, 98' respectively. Thus the free end 94' can oscillate with the free end 36 of the upper horizontal vibratory member 24 when the inert brace member 92' pivots about the longitudinal axes 112, 112' of the elastomeric members 98, 98'.

Elastomeric member

As hereinbefore stated, the elastomeric members 98, 98' are identical in all respects. The elastomeric members 98, 98' will now be described by reference to FIGURE 8.

It should be noted that a double numbering system will be employed to refer to elements which are similar. As for example, the elastomeric member shown in FIGURE 9 will be identified as the elastomeric member 98 (98').

Referring to FIGURE 9, the elastomeric member 98 (98') comprises a central sleeve 122, an annular shell 124 and an annular elastomer 126 interposed between the central sleeve 122 and the annular shell 124. The central sleeve 122 and the annular shell 124 preferably comprise metal tubing. The annular elastomer 126 is preferably comprised of rubber which is bonded preferably by vulcanization to the surfaces of the central sleeve 122 and the anular shell 124.

The clamp member 110 (110') surrounds the annular shell 124 and is clamped thereto by means of a fastener 128 extending through spaced flanges 130 (only one shown) of the clamp member 110 (110').

The annular shell 124 has shell lugs 132 extending from its outer surfaces. The shell lugs 132 are engaged in slots 134 provided in the clamp member 110 (110') to non-rotatably secure the clamp member 110 (110') to the annular shell 124.

Similarly, the central sleeve 122 has sleeve lugs 136 extending from its outer surface. The sleeve lugs 136 are engaged in slots 138 provided in the arms 104 (120) of the U-shaped bracket 100 (118) to non-rotatably secure the arms 104 (120) to the central sleeve 122.

The bolt 106 (106') extends through apertures 140 in the arms 104 (120) and through the central sleeve 122. The nut 108 (108') cooperates with the bolt 106 (196') to secure the arms 104 (120) to the central sleeve 122.

It should be evident then, that the inert brace member 92 (92'), the clamp member 110 (110') and the annular shell 124 are pivotal as a unit about the longitudinal axis 112 (112') while the arms 104 (120) and the central sleeve 122 are stationary.

The annular elastomer 126 not only provides a pivot means for the inert brace member 92 (92') but also provides a cushion for thrust forces acting axially through the inert brace member 92 (92').

I claim:
1. In a balancing stand for determining the imbalance of a rotor, the combination comprising:
   a fixed vertical standard;
   a pair of generally horizontal vibratory members cantilevered from the said fixed vertical standard, each having a fixed end at the said fixed vertical standard and a free end;
   a normally vertical drive shaft rotatably secured to the free ends of said pair of horizontal vibratory members;
   a brace member having a free end and a fixed end, said free end being connected adjacent to the free end of one of said horizontal vibratory members, said fixed end being connected to the said fixed vertical standard, the free end of said brace member being free to oscillate with the free end of the said one of said horizontal vibratory members, said brace member being angled with respect to said horizontal vibratory members and under an axial stress.
   mounting means secured to one end of the said drive shaft for supporting a rotor with its rotational axis and the rotational axis of the said drive shaft substantially aligned along a common vertical axis; and
   drive means for rotating the said drive shaft;
   said pair of horizontal vibratory members, the said brace member and the said common vertical axis normally lying in a common vertical plane.

2. The combination of claim 1 wherein each of said horizontal vibratory members comprises at least one flexible reed.

3. The combination of claim 1 wherein the said free end of said brace member is rigidly secured adjacent to the free end of the upper one of said horizontal vibratory members and said second end is rigidly secured to the said fixed vertical standard.

4. The combination of claim 1 wherein each of the said horizontal vibratory members includes a unitary locking and damping means for maintaining its free ends in a fixed position and for limiting the lateral displacements of its free ends, each said unitary locking and damping means comprising two opposed dashpots, one each secured adjacent to the free end of said vibratory member, on each side of and perpendicular with said common vertical plane; conduit means extending between said dashpots for communicating a working fluid therebetween; and valve means in said conduit means for controlling flow of said working fluid through said conduit means.

5. The combination of claim 1 including a vibration transducer element releasably secured to each of said horizontal vibratory members, said transducer element being positionable along the length of the vibratory member, said vibration transducer element being positioned normal to the said common vertical plane.

6. The combination of claim 1 including a pivotal journal means connecting the free ends of said one of said horizontal vibratory members and the free end of said brace member to said drive shaft whereby when the free ends of said one of said horizontal vibratory members and said brace member oscillate out of said common vertical plane, said one of said horizontal vibratory members and said brace member are subjected substantially entirely to transverse bending.

7. The combination of claim 6 wherein the said pivotal journal means comprises a spherical bearing.

8. In a balancing stand for determining the imbalance of a rotor, the combination comprising:
a fixed vertical standard;
a pair of generally horizontal vibratory members cantilevered from the said fixed vertical standard, each having a fixed end at the said fixed vertical standard and a free end;
a normally vertical drive shaft rotatably secured to the free ends of the said horizontal vibratory members;
a vibratory brace member having a free end rigidly secured adjacent to the free end of one of the said horizontal vibratory members and a fixed end rigidly secured to the said vertical standard, said vibratory brace member being bendable about the said fixed end whereby the said free end thereof oscillates with the free end of said one of said horizontal vibratory members, said vibratory brace member being angled with respect to said horizontal vibratory members and under an axial stress;
mounting means secured to one end of the said drive shaft for supporting a rotor with its rotational axis and the rotational axis of the said drive shaft substantially aligned along a common vertical axis; and
drive means for rotating the said drive shaft;
said pair of horizontal vibratory members, said vibratory brace member and the said common vertical axis normally lying in a common vertical plane.

9. In a balancing stand for determining the imbalance of a rotor, the combination comprising:
a fixed vertical standard;
a pair of generally horizontal vibratory members cantilevered from the said fixed vertical standard, each having a fixed end at the said fixed vertical standard and a free end;
a normally vertical drive shaft rotatably secured to the free ends of the said horizontal vibratory members;
a vibratory brace member having a free end rigidly secured adjacent to the free end of one of said horizontal vibratory members and a fixed end rigidly secured to the said fixed vertical standard at a point between the fixed ends of the said horizontal vibratory members, said vibratory brace member being bendable about the said fixed end whereby the said free end thereof oscillates with the free end of said one of said horizontal vibratory members, said vibratory brace member being angled with respect to said horizontal vibratory members and under an axial stress;
mounting means secured to one end of the said drive shaft for supporting a rotor with its rotational axis and the rotational axis of the said drive shaft substantially aligned along a common vertical axis whereby the imbalance of the said rotor causes the said drive shaft to oscillate about a rocking point disposed on the said common vertical axis; and
drive means for rotating the said drive shaft;
said pair of horizontal vibratory members, said vibratory brace member and the said common vertical axis normally lying in a common vertical plane.

10. In a balancing stand for determining the imbalance of a rotor, the combination comprising:
a fixed vertical standard;
a pair of generally horizontal vibratory members cantilevered from the said fixed vertical standard, each of said horizontal vibratory members comprising at least one flexible reed having a fixed end at the said fixed vertical standard and a free end;
a normally vertical drive shaft rotatably secured to the free ends of the said horizontal vibratory members, said drive shaft having a shaft end extending outboard of the free ends of the said horizontal vibratory members;
a vibratory brace member comprising at least one flexible reed having a free end rigidly secured adjacent to the free end of the upper one of said horizontal vibratory members and a fixed end rigidly secured to the said fixed vertical standard at a point between the fixed ends of the said horizontal vibratory members, said vibratory brace member being in compression and bendable about said fixed end whereby the said free end thereof oscillates with the free end of said upper one of said horizontal vibratory members;
mounting means secured to the said drive shaft for supporting a rotor with its rotational axis and the rotational axis of the said drive shaft substantially aligned along a common vertical axis whereby the imbalance of the said rotor causes the said drive shaft to oscillate about a rocking point disposed on the said common vertical axis; and
drive means for rotating the said drive shaft;
said horizontal vibratory members, said vibratory brace member, and said common vertical axis normally lying in a common vertical plane.

11. In a balancing stand for determining the imbalance of a rotor, the combination comprising:
a fixed vertical standard;
upper and lower generally horizontal vibratory members cantilevered from the said fixed vertical standard, each having a fixed end at the said fixed vertical standard and a free end;
a normally vertical drive shaft rotatably secured to the free ends of said upper and lower horizontal vibratory members, said drive shaft including a shaft end extending above the upper horizontal vibratory member and above the said fixed vertical standard;
a brace member having a free end and a fixed end, said free end being connected adjacent to the free end of one of said horizontal vibratory members, said fixed end being connected to the said fixed vertical standard, the free end of said brace member being free to oscillate with the free end of said one of said horizontal vibratory members, said brace member being angled with respect to said horizontal vibratory members and under an axial stress;

a mounting plate non-rotatably secured to the said shaft end for supporting a rotor with its rotational axis and the rotational axis of the said drive shaft substantially aligned along a common vertical axis;

drive means secured to the upper end of the said fixed vertical standard, said drive means including a drive pulley disposed above the said fixed vertical standard; and drive belt means engaged in driving relation with the said mounting plate and the said drive pulley for rotating the said mounting plate;

said upper and lower horizontal vibratory members, the said brace member and the said common vertical axis normally lying in a common vertical plane.

12. In a balancing stand for determining the imbalance of a rotor, the combination comprising:

a fixed vertical standard;

a pair of generally horizontal vibratory members cantilevered from the said fixed vertical standard, each having a fixed end at the said fixed vertical standard and a free end;

a normally vertical drive shaft rotatably secured to the free ends of the said pair of horizontal vibratory members;

a brace member having a free end and a fixed end, said free end being connected adjacent to the free end of one of said horizontal vibratory members, said fixed end being connected to the said fixed vertical standard, at least one said end being resiliently and pivotally connected whereby the free end of the said brace member is free to oscillate with the free end of said one of said horizontal vibratory members, said brace member being angled with respect to said one of said vibratory members and under an axial stress;

mounting means secured to one end of the said drive shaft for supporting a rotor with its rotational axis and the rotational axis of the said drive shaft substantially aligned along a common vertical axis; and drive means for rotating the said drive shaft;

said pair of horizontal vibratory members, the said brace member and the said common vertical axis normally lying in a common vertical plane.

13. In a balancing stand for determining the imbalance of a rotor, the combination comprising:

a fixed vertical standard;

a pair of generally horizontal vibratory members cantilevered from the said fixed vertical standard, each having a fixed end at the said fixed vertical standard and a free end;

a normally vertical drive shaft rotatably secured to the free ends of the said pair of horizontal vibratory members;

a brace member having a free end and a fixed end, said free end being rigidly secured adjacent to the free end of one of the said horizontal vibratory members, said fixed end being resiliently and pivotally secured to the said fixed vertical standard whereby the free end of said brace member is free to oscillate with the free end of the said one of said horizontal vibratory members, said brace member being angled with respect to said one of said vibratory members and under an axial stress;

mounting means secured to one end of the said drive shaft for supporting a rotor with its rotational axis and the rotational axis of the said drive shaft substantially aligned along a common vertical axis; and drive means for rotating the said drive shaft;

said pair of horizontal vibratory members, the said brace member and the said common vertical axis normally lying in a common vertical plane.

14. In a balancing stand for determining the imbalance of a rotor, the combination comprising:

a fixed vertical standard;

a pair of generally horizontal vibratory members cantilevered from the said fixed vertical standard, each having a fixed end at the said fixed vertical standard and a free end;

a normally vertical drive shaft rotatably secured to the free ends of the said pair of horizontal vibratory members;

a brace member having a free end and a fixed end, said free end being resiliently and pivotally secured adjacent to the free end of one of said vibratory members, said fixed end being resiliently and pivotally secured to the said fixed vertical standard whereby the free end of said brace member is free to oscillate with the free end of the said one of said horizontal vibratory members, said brace member being angled with respect to said horizontal vibratory members and under an axial stress;

mounting means secured to one end of the said drive shaft for supporting a rotor with its rotational axis and the rotational axis of the said drive shaft substantially aligned along a common vertical axis; and drive means for rotating the said drive shaft;

said pair of horizontal vibratory members, the said brace member and the said common vertical axis normally lying in a common vertical plane.

15. In a balancing stand for determining the imbalance of a rotor, the combination comprising:

a fixed vertical standard;

a pair of generally horizontal vibratory members cantilevered from said fixed vertical standard, each having a fixed end at said fixed vertical standard and a free end;

a normally vertical drive shaft rotatably secured to the free ends of said pair of horizontal vibratory members;

a brace member having a free end and a fixed end, said brace member comprising a flexible reed having its free end secured adjacent to the free end of the upper one of said horizontal vibratory members and its fixed end rigidly secured to said fixed vertical standard at a point between the fixed ends of said horizontal vibratory members, said flexible reed being in compression;

mounting means secured to one end of said drive shaft for supporting a rotor with its rotational axis and the rotational axis of said drive shaft substantially aligned along a common vertical axis; and drive means for rotating said drive shaft;

said pair of horizontal vibratory members, said brace member and said common vertical axis normally lying in a common vertical plane.

References Cited by the Examiner

UNITED STATES PATENTS

| 1,971,562 | 8/34 | Heymann | 73—478 |
|---|---|---|---|
| 2,933,984 | 4/60 | Hack | 73—463 |

FOREIGN PATENTS

| 1,199,148 | 6/59 | France. |
| 201,787 | 2/08 | Germany. |
| 775,803 | 5/57 | Great Britain. |

RICHARD C. QUEISSER, *Primary Examiner.*

JAMES J. GILL, *Examiner.*